United States Patent [19]
Lichtfuss

[11] Patent Number: 4,840,498
[45] Date of Patent: Jun. 20, 1989

[54] SELF-ALIGNING JOURNAL BEARING
[75] Inventor: Gerhardt E. Lichtfuss, Rockford, Ill.
[73] Assignee: Sundstrand Corp., Rockford, Ill.
[21] Appl. No.: 212,574
[22] Filed: Jun. 28, 1988
[51] Int. Cl.$^4$ .............................................. F16C 25/04
[52] U.S. Cl. ...................... 384/213; 384/99; 384/906
[58] Field of Search ............... 384/213, 906, 99, 214, 384/389, 373, 399, 398

[56] References Cited
U.S. PATENT DOCUMENTS

| | | |
|---|---|---|
| 1,562,130 | 11/1925 | Stitzinger . |
| 2,983,555 | 5/1961 | Miller .................... 384/213 |
| 3,100,130 | 8/1963 | Deffrenne . |
| 3,256,451 | 6/1966 | Shipman . |
| 3,360,309 | 1/1967 | Voorhies . |
| 3,464,747 | 3/1968 | Schmidt . |
| 3,476,447 | 3/1968 | Boyd . |
| 3,659,910 | 5/1972 | Foster . |
| 3,947,077 | 3/1976 | Berg et al. .................... 384/213 |
| 4,005,916 | 2/1977 | Dillon . |
| 4,514,099 | 4/1985 | John et al. . |
| 4,597,676 | 7/1986 | Vohr et al. . |
| 4,606,656 | 8/1986 | LaRou .................... 384/906 |
| 4,636,095 | 2/1987 | Gerling . |
| 4,671,681 | 6/1987 | LaRou .................... 384/906 |

Primary Examiner—Lenard A. Footland
Attorney, Agent, or Firm—Antonelli, Terry & Wands

[57] ABSTRACT

A self-aligning bearing assembly, especially adapted for use in space, contains lubrication passages to provide a stiff fluid film to support a rotating member. One or more anti-rotation pins extend between the ball and race members which allow a small articulating motion without full rotation of the ball member and race member relative to one another.

12 Claims, 2 Drawing Sheets

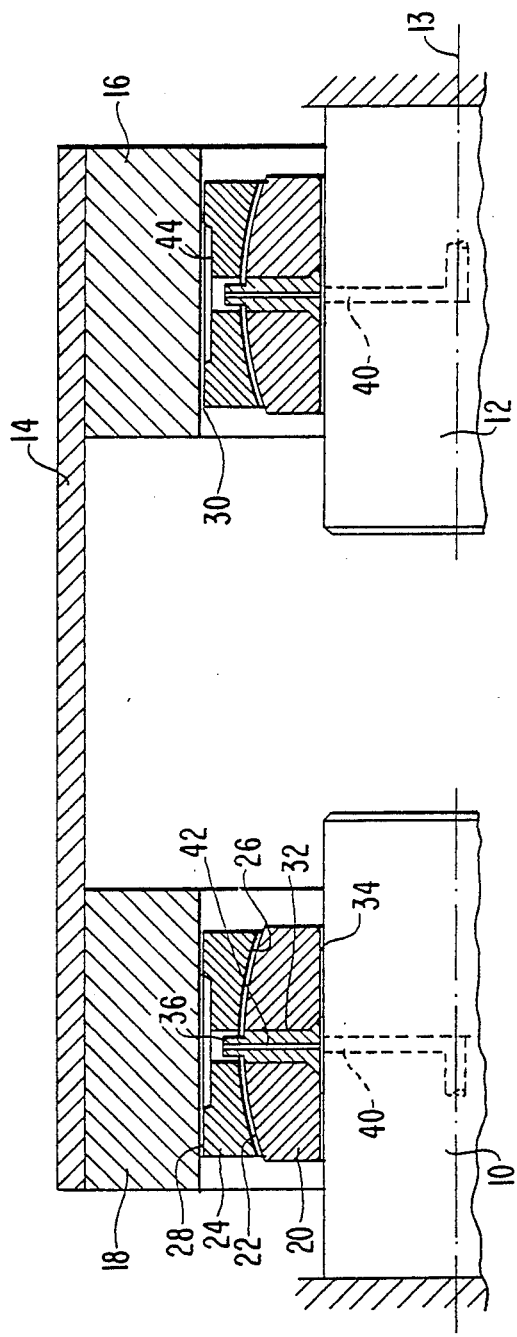

SELF-ALIGNING JOURNAL BEARING

TECHNICAL FIELD

This invention relates to self-aligning journal bearings that are adapted for use with thin film lubricants thtt will provide a stiff fluid film to support a rotating member.

BACKGROUND ART

Where a bearing has two mating parts, such as a shaft and a surrounding bushing that are rotatable one relative to the other, the inherent problem is that the bearing is rigid and not self-aligning to accommodate for eccentricities and out-of-squareness that results from manufacturing tolerances. With the use of thin film lubricants a low clearance is required that will provide a stiff fluid film to support the rotating member. In both cases, machining of the hardware to assure final assembly and proper operation is extremely difficult and costly.

DISCLOSURE OF INVENTION

An object of the invention is to provide a novel spherical bearing assembly having a ball member and a race member arranged to provide a self-aligning journal and incorporating several through holes to provide lubrication.

A further object is to install one or more antirotation pins between the ball member and the race member which are anchored in the ball. An enlarged head is trapped between the inner diameter of the ball and the outer surface of a stationary support. The stationary support may have conduits which deliver lubricant to through holes and at the head of each pin thereby to provide a construction usable in special applications such as a space station.

These and other objects to the invention will become more fully apparent from the claims and from the description when read in conjunction with the drawings.

BRIEF DESCRIPTION OF DRAWINGS

FIG. 1 is a half view in section which schematically illustrates the self-aligning journal bearing support structure of the present invention;

BEST MODE FOR CARRYING OUT THE INVENTION

With reference to FIG. 1, a pair of grounded supports 10, 12 are centrally located about the rotational axis 13 of a cylindrically shaped member 14 which is shown to be supported on the outer surfaces of bushings 16 and 18. Supports 10, 12 may, if desired be a stub shaft having a diameter of about 2 inches. Cylindrically shaped member 14 along with bushings 16 and 18 may be part of a rotating assembly.

Figure 3:
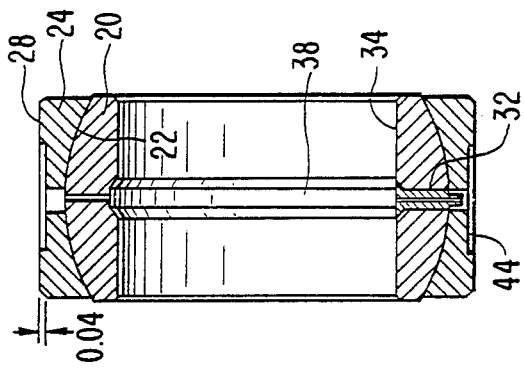
FIG. 3 is a side view in section taken along lines 3—3 of the bearing assembly of FIG. 2.
Figure 2:
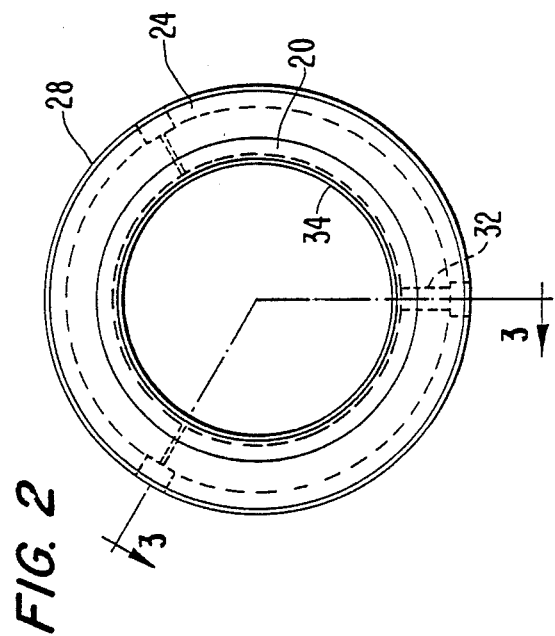
FIG. 2 is a plan view of a bearing assembly which may be used in the support structure according to the invention.
Figure 4:
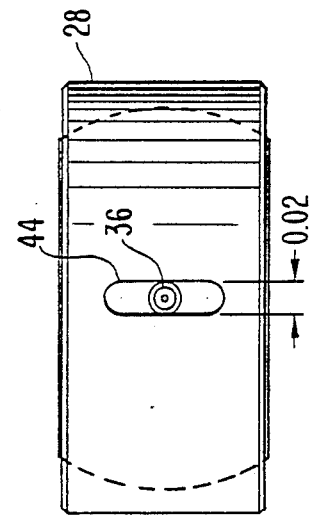
FIG. 4 is a front view of the bearing of FIG. 2.

The bearing assemblies located between each of supports 10, 12 and each of bushings 16, 18 are also shown in FIGS. 2-4 and may be identical. A self-aligning feature is provided because an inner ball member 20 has an outer spherical surface 22 and the race member 24 has a inner spherical surface 26. The outer surface 28 of race member 24 is cylindrical and fits inside the mating cylindrical surface of a respective bushing 16, 18.

Because machining of the inner surface of bushing 16, 18 and of the outer surface 28 of the race member 24 is extremely difficult and costly, the self-aligning bearing arrangement is used. Important to the present invention is the creation of a stiff fluid film in the space 30 between the outer surface 28 of race member 24 and the inner surface of the bushings 16, 18.

Starting with a known type of self-aligning journal bearing that is in common use, which consists of an articulating ball member 20 within the race member 24 a modification is necessary to include provisions for lubrication at the space 30. Three lubrication passages are shown in FIG. 3 at equally spaced positions around the periphery. Radial holes are formed in the ball and race members to proide lubrication passages.

One or more anti-rotation pins 32 are positioned at the lubrication passages around the bearing. Radial holes are formed in the bearings so that the pins 32 extend from a position with their heads located on the inner surface 34 of ball member 20 and their free ends 36 are located well within the body of the race member 24. Each pin 32 fits snugly in its respective hole in the ball member 20. The free ends 36 of the pins 32 as illustrated in FIG. 1 are smaller than the hole in the race member 24. This size difference allows a small articulating motion without full rotation of the ball member 20 and race member 24 relative one to another.

As best shown in FIG. 3, the inner surface 34 of ball member 20 may have a peripheral grove 38 for receiving pressurized lubrication from a suitable ducting 40 (see FIG. 1) provided in the respective shafts 10, 12. Each pin 32 incorporates a lubrication orifice 42 which meters the required amount of lubrication flow to the interfaces between spherical surfaces 22 and 26 on the ball and race member 20 and 24 respectively. Lubrication is provided to slot 44 (see also FIG. 4) which surrounds each of the through holes which serve as lubricant flow passages and optional anti-rotation pin locations.

Slot 44 may have a depth of about 0.04" and a small dimension of about 0.2" in the direction perpendicular to the rotation axis. The length of the slot 44 is about four-fifths of the length of the bearing contact surface in the direction of the rotation axis. Thus, if the axial length of the bearing contact surface is about 1.25", the length of slot 44 may be about one inch. With the illustrated dimensions, it is possible to obtain a fluid film lubricated bearing with thin fluids such as water, freon, toluene and anhydrous ammonia, and to provide a stiff fluid film to support the rotating member.

While only a single embodiment has been illustrated, it should be recognized that other alternatives and modifications incorporating the lubrication and anti-rotation features are contemplated. The self-aligning feature is applicable for either the spherical bearing or the bushing to be the rotating part relative to the other. All equivalents which fall within the scope of the appended claims are intended to be covered thereby.

I claim:

1. A self-aligning journal fluid film lubricated bearing having a bushing mounted about a cylindrical surface of a race member for relative rotational movement therebetween about a rotational axis comprising:

a ball member having an inner surface and an outer spherical surface portion with a plurality of spaced radial holes positioned in a plane perpendicular to said rotational axis;

a race member having an outer cylindrical surface and an inner spherical surface that is adapted to mate with the spherical surface portion of said ball member, said race member having a plurality of spaced holes extending radially through the race member from the inner to the outer surface, each hole being located in a slot having a major axis lying in a radial plane which passes through said rotational axis and a depth effective to provide a distribution of a lubricating fluid in the form of a film for supporting the rotating load on the bearing during operation;

means for providing a fluid film between an inner surface of said bushing and the outer cylindrical surface of said race member to support the rotating load on the bearing during operation, said means including an orifice associated with said spaced radial holes which meters the required amount of lubricant flow both to the contacting spherical surfaces and to the bushing and race member contacting surfaces; and at least one anti-rotation pin tightly fitted in a hole of said ball member and extending into a corresponding hole in said race member to provide a connection allowing small articulating motion but no full rotation between the ball member and the race member.

2. The bearing as defined in claim 1 wherein said pin contains a head portion located at the inner surface of said ball member and a through hole extending from the head portion partially into the hole of said race member, there being a supply of lubrication at the head portion of each pin, and wherein, the hole in the pin serves as said metering orifice.

3. The bearing as defined in claim 2, wherein the ball member is mounted on a grounded shaft which contains means for supplying lubrication to said pin head portion and the bushing is mounted for rotational movement relative to said grounded shaft.

4. The bearing as defined in claim 3 wherein the lubricant is selected from the group consisting of water, freon, toluene and anhydrous ammonia, said lubricant being present in an arrangement and quantity to provide a stiff fluid film to support said bushing.

5. The bearing as defined in claim 1, wherein the ball member is mounted on a grounded shaft and contains three radial holes spaced around the periphery of said spherical surface portion with an anti-rotation pin in each of said three holes and the bushing is mounted for rotational movement relative to said grounded shaft.

6. The bearing as defined in claim 5 wherein each of said three pins has a through hole extending along the length of the pin, the lubricant is selected from the group consisting of water, freon, toluene and anhydrous ammonia, said lubricant is ducted through the holes of said pins in a quantity to provide a stiff fluid film to support said bushing on an outer surface of said race member.

7. A radial bearing structure for supporting a bushing having an inner bore and being mounted for rotation about an axis comprising:

a ball member and race member assembly having mating spherical surfaces with a first clearance for lubrication, said assembly having an outer surface that is in sliding rotational engagement with an inner surface of said bushing with a second clearance for lubrication;

a plurality of radially extending holes passing through the ball and race members with the race member further having a plurality of slots each being in fluid communication with one of said race member holes and having a major axis substantially parallel to the rotation axis;

an anti-rotation pin tightly fitted in at least one of said ball member holes and having a free end extending into one of said race member holes to prevent full rotation of said race member about the rotational axis relative to said ball member while allowing small articulating motion between said ball and race members during rotation of said bushing thereby to provide alignment capability of the race outer surface with the inner hole of the bushing; and means to provide lubrication flow to both of said surface clearances including a lubrication passage at each of said radially extending holes.

8. The structure as defined in claim 7 further including means for supplying a lubricating liquid to the holes at an internal portion of said ball member whereby each of said holes delivers said lubricating liquid to an interior position of said race member and both of said surface clearances are lubricated.

9. The structure as defined in claim 8 wherein said pin has a through hole extending from a first portion that is supplied with said lubricating liquid to a free end portion located in the hole at the interior position of said race member.

10. The structure as defined in claim 9 wherein the lubricant is selected from the group consisting of water, freon, toluene and anhydrous ammonia, said lubricant being present in an arrangement and quantity to provide a stiff fluid film to support said bushing on the outer surface assembly.

11. The structure as defined in claim 7 wherein said plurality of slots comprises three slots equally spaced around the periphery of the outer surface of said assembly, each of said slots being in alignment with one of said radially extending holes in said race member to be in liquid communication with a lubrication channel, said slots having a depth of about 0 04", a width in the direction of rotation of about 0.2" and a length in a cross direction parallel to the rotation axis of about four-fifths of the length of the assembly outer surface in the direction of the rotation axis.

12. The structure as defined in claim 11 wherein the lubricant is selected from the group consisting of water, freon, toluene and anhydrous ammonia, said lubricant being present in an arrangement and quantity to provide a stiff fluid film to support said bushing on the assembly outer surface.

* * * * *